May 5, 1936.  H. MICHEL  2,039,917
MEANS FOR ATTACHING A HANDLE TO A STEM OR THE LIKE
Filed July 24, 1935
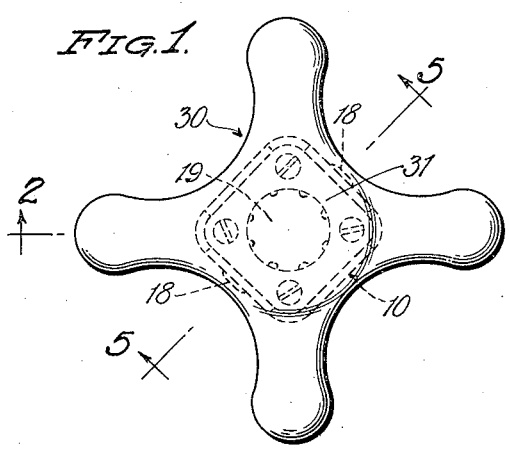
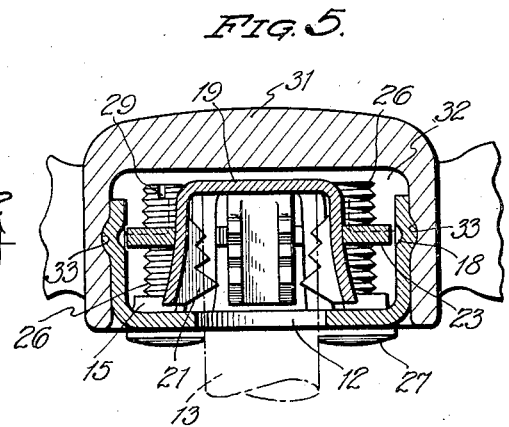
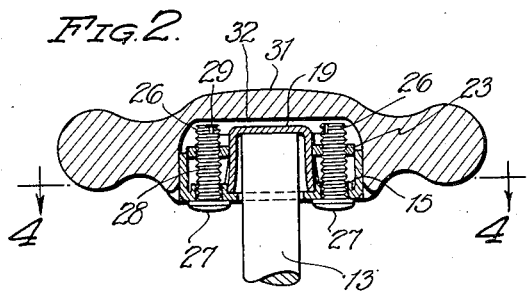
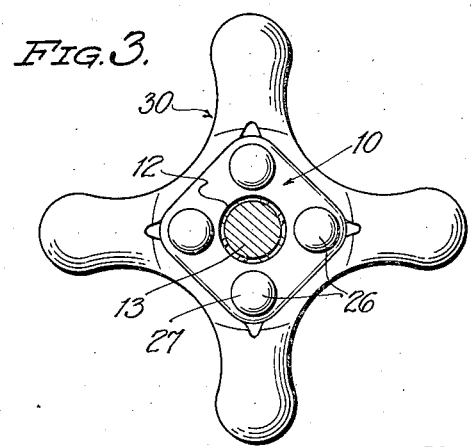
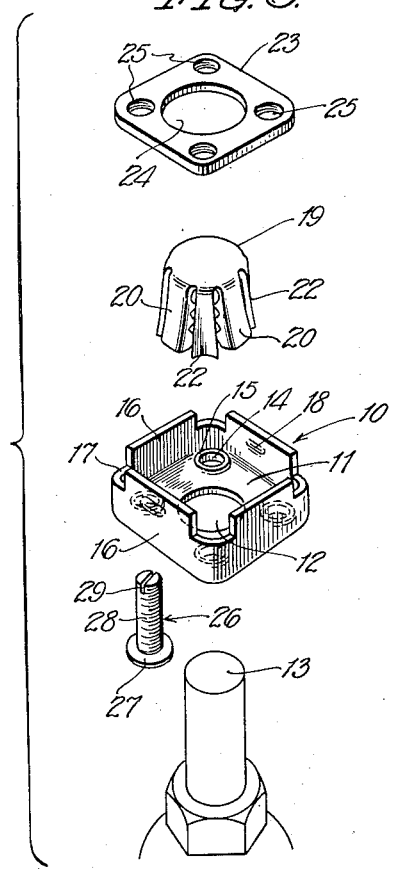
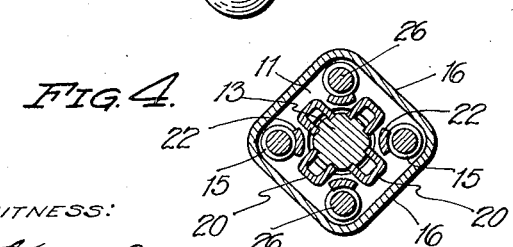
HAROLD MICHEL.
INVENTOR.
BY Ely & Pattison.
ATTORNEYS.

Patented May 5, 1936

2,039,917

UNITED STATES PATENT OFFICE 2,039,917

MEANS FOR ATTACHING A HANDLE TO A STEM OR THE LIKE

Harold Michel, Brooklyn, N. Y.

Application July 24, 1935, Serial No. 32,829

5 Claims. (Cl. 287—53)

This invention relates to improvements in handle connections and more particularly to a means for fastening a handle to a rotatable stem, shaft, rod, or the like.

The invention has for its main object, the provision of a means for fastening the manipulating handle of a faucet or valve to a rotatable stem to assure a positive means of the handle and stem for turning as a unit. More particularly, the fastening means is adaptable for use with faucet handle replacements and is attachable to stems of different sizes and shapes, and may be employed in other instances where it may be desired to key a part to a rotatable stem, shaft, rod, or the like.

Another feature of the invention resides in a fastening means for attaching a faucet handle to its stem whereby the outer end of the stem and the fastening means are concealed within the handle so as not to detract from the attractiveness of the plumbing fixture.

A further feature of the invention is to provide a fastening means for the above mentioned purpose which enables one unskilled in the art of plumbing fixture repair to replace a worn or broken faucet handle.

With these and other objects in view, the invention resides in the certain novel construction, combination and arrangement of parts, the essential features of which are hereinafter fully described, are particularly pointed out in the appended claims, and are illustrated in the accompanying drawing, in which:

Figure 1 is a top plan view with parts shown in dotted lines.

Figure 2 is a vertical sectional view on the line 2—2 of Figure 1.

Figure 3 is a bottom plan view of the handle and fastening means and showing the stem in cross section.

Figure 4 is a horizontal sectional view on the line 4—4 of Figure 2.

Figure 5 is an enlarged vertical sectional view on the line 5—5 of Figure 1.

Figure 6 is a perspective view showing the several parts of the invention in drawn out relation.

Referring to the drawing by reference characters, the numeral 10 designates a cup shaped base member which in shown as square in plan with rounded corners, although the same may be hexagonal or other eccentric-like shape. The base member 10 is constructed of metal and includes a bottom wall 11 having a central opening 12 for the passage of the stem 13 of a faucet or valve to which a handle is to be connected. Adjacent the corners, the bottom 11 is provided with screw openings 14, the openings being surrounded on the inner side of the bottom wall with annular upstanding flanges 15. Opposed side walls 16 rise upwardly from the bottom wall 11 and the said walls are cut away at their corners as at 17 in order to render the top portions of the side walls resilient for a purpose to be hereinafter explained. Two of the opposed walls 16 adjacent their top edges are provided with inwardly extending teats 18.

As before mentioned, the upper end of the valve stem 13 extends through the opening 12 in the base member 11 and projects a sufficient distance to receive a gripping member 19. The gripping member 19 is of inverted cup shape and is constructed of stiff resilient metal and includes downwardly and outwardly extending jaws 20. Four of such jaws have been shown and they are disposed in opposed relation as shown in Figure 4 and each jaw is substantially U-shaped in cross section, and the inner edges are serrated as at 21. The serrations graduate in size from the innermost serration or tooth to the outermost one. Extending downwardly between the jaws 20 and disposed out of the circumferential plane of the exterior of the jaws, are legs 22, each leg being concavo-convex in cross section, the concave side facing outwardly so as to respectively seat against the upstanding flanges 15 on the bottom wall of the base member 11. Thus the gripping member 19 interlocks with the base member to prevent turning of the gripping member relative to the base member. Due to the outward flare of the jaws 20, the legs 22 extend below the plane of the lower ends of the jaws and rest upon the bottom wall 11 of the base member 10, whereas the top wall of the cup shaped gripping member overlies the top end of the stem 13.

Fitting downwardly over the top of the gripping member 19 is a wedging plate 23, the same having a central opening 24 for the passage of the top end of the gripping member 19. The plate 24 is of a size and shape to freely fit within the confines of the base member 10, and adjacent the corners of the plate 23 are threaded openings 25.

Passed upwardly through the openings 14 in the base member 10 are screws 26, the heads 27 of which engage and underlie the bottom wall 11 of the base member whereas the threaded shanks 28 pass upwardly and threadedly engage the walls of the threaded openings 25. The free ends of the shank 28 are each provided with a kerf 29 for the reception of a screw driver to facilitate turning of the screw.

From the description thus far, it will be seen that when the parts are assembled in the order described, that by turning the screws 28 by means of a screw driver inserted in the kerf 29, that the wedging plate 23 will be fed downwardly, setting up a wedging action between the plate and the jaws 20 of the gripping member 19. This wedging action tends to contract the resilient jaws 20, thus forcing the serrated edges of the jaws into gripping engagement with the stem 13. If sufficient pressure is applied to the resilient jaws, the serrated edges may be caused to embed themselves in the valve stem 13 as illustrated in Figure 4 of the drawing, thus assuring a positive connection between the stem and the fastening means.

After the parts have been assembled as hereinbefore explained, a handle 30 is releasably attached to the base member 10. The handle 30 includes a hub 31 which is provided with a recess 32 opening through the under side thereof. The recess 32 is of a size and shape to frictionally receive the base member 10 and two of the opposed inner walls of the recess are provided with grooves 33 for receiving the teats 18 provided on opposite walls of the base member 10. Thus it will be seen that the handle 30 may be snapped down into position over the base member 10 and releasably interlock therewith. Should it be desired at any time to remove the handle 30, an instrument may be inserted upwardly between one of the side walls of the base member in adjacent wall of the recess 32 so as to force one of the walls inwardly and effect disengagement of the teat 18 and its receiving groove 33. Although the handle member 30 shown in the drawing includes radially extending arms, it will be understood that other shapes of handles may be formed with a similar recess 32 to effect connection of the same to a valve stem by the fastening means herein shown and described.

When the handle 30 is in position as shown and described, it is impossible for the handle to turn relative to the base member and for the base member to turn relative to the stem in view of the positive connection between the stem and the base member through the wedge means which includes the gripping member and the wedge plate. It will be noted that the bottom of the recess 32 is closed by the bottom wall 11 of the base member 10 and the entire fastening means is enclosed and concealed within the recess 32 of the handle.

While I have shown and described what I consider to be the most practical embodiment of my invention, I wish it to be understood that such changes and alterations as come within the scope of the appended claims may be resorted to if desired.

Having thus described the invention, what I claim as new and desire to secure by Letters Patent of the United States, is:—

1. In combination, a stem, a cup shaped base member having flat sides and an opening for the passage of one end of said stem, an inverted cup shaped gripping member fitting about said stem, interengaging means between said gripping member and said base member for preventing turning movement of one with respect to the other, wedge means for contracting and holding said resilient gripping member in gripping engagement with said stem, a handle having a recess therein of a shape to snugly receive said base member, and releasable interlocking means between said base member and the walls of said recess.

2. In combination, a stem, a handle having a recess opening through the under side thereof, a closure member for closing said recess and having an opening therein for the passage of one end of said stem, means for removably connecting said closure member to said handle, gripping means contained within said recess for gripping said stem, and means preventing turning of said gripping means relative to said closure member.

3. Means for fastening a handle to a rotatable stem comprising a base member having an opening therein for the passage of one end of a stem, an inverted cup shaped gripping member having resilient jaws, inter-engaging means between the gripping member and said base member for alining said gripping member with said opening and for preventing turning of said gripping member relative to said base member, and wedge means for contracting said jaws and for holding them in contracted position.

4. Means for fastening a handle to a rotatable stem comprising a base member having an opening therein for the passage of one end of a stem, an inverted cup shaped gripping member having resilient outwardly and downwardly extending jaws, interengaging means between the gripping member and said base member for alining said gripping member with said opening and for preventing turning of said gripping member relative to said base member, a wedge plate having an opening for receiving the top end of said cup shaped gripping member, and screws freely passing upwardly through said base member and threadedly engaging the walls of threaded openings in said wedge plate, whereby turning of said screws in one direction to wedge the walls of the opening in said wedge plate will effect contraction of said resilient jaws.

5. Means for fastening a handle to a rotatable stem comprising a base member having an opening therein for the free passage of one end of a stem and openings for the free passage of screws, annular upstanding flanges on said base member extending about said screw openings, an inverted cup shaped gripping member having spaced resilient gripping jaws and legs intermediate said gripping jaws, said legs being concavo-convex, the concave sides of said legs engaging the annular flanges on said base member, a wedge plate having a central opening through which the closed end of said inverted cup shaped gripping member extends, threaded openings provided in said wedge plate in alinement with the screw openings in said base member, headed screws passing upwardly through said screw openings and threaded to said threaded openings, the free ends of the threaded shanks of said screws having kerfs therein, and means for securing said base member to a handle member.

HAROLD MICHEL.